United States Patent

Huber et al.

[11] Patent Number: 5,871,317
[45] Date of Patent: Feb. 16, 1999

[54] CARGO LATCH

[75] Inventors: Thomas Huber, Iffeldorf; Jürgen Völkel, Bruckmühl; Richard Holzner, Dorfen, all of Germany

[73] Assignee: Telair International GmbH, Hausham, Germany

[21] Appl. No.: 749,537

[22] Filed: Nov. 15, 1996

[30] Foreign Application Priority Data

Nov. 30, 1995 [DE] Germany .................. 195 44 796.4

[51] Int. Cl.$^6$ .................................................. B60P 7/08
[52] U.S. Cl. ........................ 410/79; 410/69; 410/77; 410/92; 410/94
[58] Field of Search ................... 410/69, 77, 78, 410/79, 80, 92, 94, 95; 244/118.1, 137.1; 414/536; 248/500

[56] References Cited

U.S. PATENT DOCUMENTS

| | | | |
|---|---|---|---|
| 3,377,040 | 4/1968 | Hansen | 410/79 |
| 3,759,476 | 9/1973 | Goodwin | 410/69 |
| 3,778,012 | 12/1973 | Fernandez | 410/69 |
| 4,089,275 | 5/1978 | Pelletier | 410/79 |
| 4,379,668 | 4/1983 | Pelletier | 410/77 |
| 4,583,896 | 4/1986 | Vogg et al. | 410/69 |
| 5,131,606 | 7/1992 | Nordstrom | 244/137.1 X |
| 5,370,342 | 12/1994 | Nordstrom | 410/95 X |

Primary Examiner—Stephen T. Gordon
Attorney, Agent, or Firm—Howard & Howard

[57] ABSTRACT

So-called butterfly latches are known, by way of which containers, pallets or similar items of freight can be secured within the cargo area of an aircraft. These comprise a frame that can be attached to holding rails on the floor of the cargo area. In the present latch, in the frame is disposed a double latch hook comprising two arms that are hinged to one another at first ends and at these first ends are provided with hook elements so constructed as to engage and retain items of cargo. At second ends the arms are mounted in the frame so that they can move in a plane of rotation in such a way that when they are struck by an item of cargo travelling in a first horizontal direction parallel to the plane of rotation, the first ends of the arms are deflected downward from an upper operating position toward the frame. To prevent unintended collapse of the arms, there are provided releasable locking mechanisms that in their locked position block downward rotation of the arms in such a way that the arms can be deflected downward only when unlocked by the frontal impact of an item of cargo moving in the first horizontal direction against one of the arms.

9 Claims, 6 Drawing Sheets

CARGO LATCH

FIELD OF THE INVENTION

The present invention relates to a latch for securing containers, pallets or similar items of cargo within the cargo area of an aircraft.

DESCRIPTION OF THE PRIOR ART

The latch with which the present case is concerned is usually called a "butterfly latch" and serves to fix in the vertical and lateral directions items of cargo, in particular pallets or containers, in the position to which they have been conveyed for storage in a cargo area of an aircraft. For this purpose the latch comprises hooks that overlap corresponding projections on the container.

When a container slides over such a latch in the direction perpendicular to the retaining direction, the latch is tilted toward the frame from its upright operating position.

Experience has shown that latches that can be rolled over in this way occasionally become stuck, but in particular while the cargo area is being loaded sometimes do not stand up in their correct operating position, so that containers are not secured.

The object of the invention is to provide a cargo latch of the kind cited above which is constructed simply in such a way that its security is improved.

SUMMARY OF THE INVENTION

According to the present invention there is provided a cargo latch for securing items of cargo in the cargo area of an aircraft comprising a frame adapted for attachment to holding rails located on the floor of the cargo area; a double latch hook mounted in the frame and comprising two arms that are pivotally mounted to one another at first ends and that have second ends mounted in the frame, each of the first ends being provided with a hook element so constructed as to be capable of engaging and retaining an item of cargo; and releasable locking mechanisms connected to said arms and moveable between a locked position and an unlocked position; the second ends of the arms being mounted in the frame in such a way that, when the locking mechanisms are in their unlocked position, the arms can move in a plane of rotation (x,z) when they are struck by an item of cargo travelling in a first horizontal direction (x) parallel to the plane of rotation (x,z), the first ends of the arms being deflected downward from an upper operating position toward the frame; and the releasable locking mechanisms in their locked position blocking downward rotation of the arms in such a way that the arms can be deflected downward only when unlocked by the frontal impact of an item of cargo moving in the first horizontal direction (x) against one of the arms.

Thus, when a whole container is pushed into a position sideways over the latch, the latch can be correctly deflected downward to permit the container to pass over it. However, when part of a container is pushed into a position and slides along the latch, the latter remains locked in its operating position and cannot unintentionally be deflected downward from its operating position.

Advantageously, at least one of the arms, but preferably both, is mounted in the frame so as to be longitudinally slidable in the first horizontal direction (x) perpendicular to the retaining direction.

Preferably also, the locking mechanisms connect the two ends of the arms so as to prevent their being disengaged by traction. This ensures that the latch is very stably held in the operating position.

Preferably also, the locking mechanisms each comprise a locking lever that is rotatably mounted at a first end to the second end of one of the arms respectively and at a second end is so constructed it can engage the second end of the other lever so as to resist being separated therefrom by traction when the arms are in their operating position and can disengage the second end of the other lever when rotated.

Preferably also, the locking mechanisms comprise two actuating levers, each of which, when struck by a moving item of cargo, rotates an associated locking lever and disengages it from the other locking lever. This arrangement ensures that the construction can be adapted to the force and travel-distance situations necessarily imposed by the overall arrangement.

Preferably also, a spring means is provided that urges the latch hook into its operating position. This spring means is in turn preferably attached to the locking mechanisms in such a way that it urges the locking mechanisms into their locked position.

As a result of the aforesaid, with the simplest of means, a high degree of security against undesired unlocking is provided.

DESCRIPTION OF A PREFERRED EMBODIMENT

Figure 1:
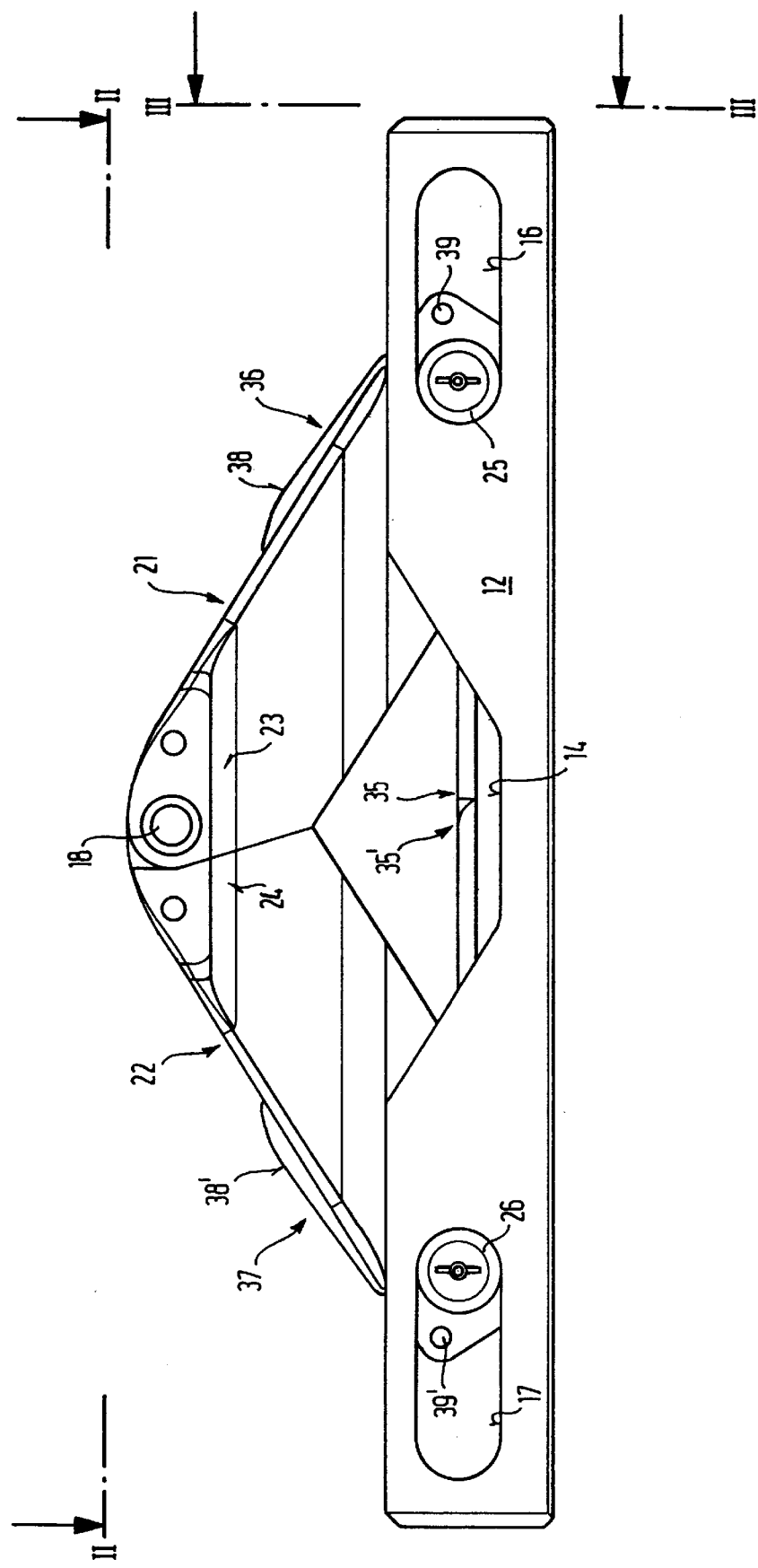
FIG. 1 is a side view of one embodiment of cargo latch according to the invention.

In the following description, identical reference numerals are used for identical parts of the latch or parts with an identical function.

Figure 2:
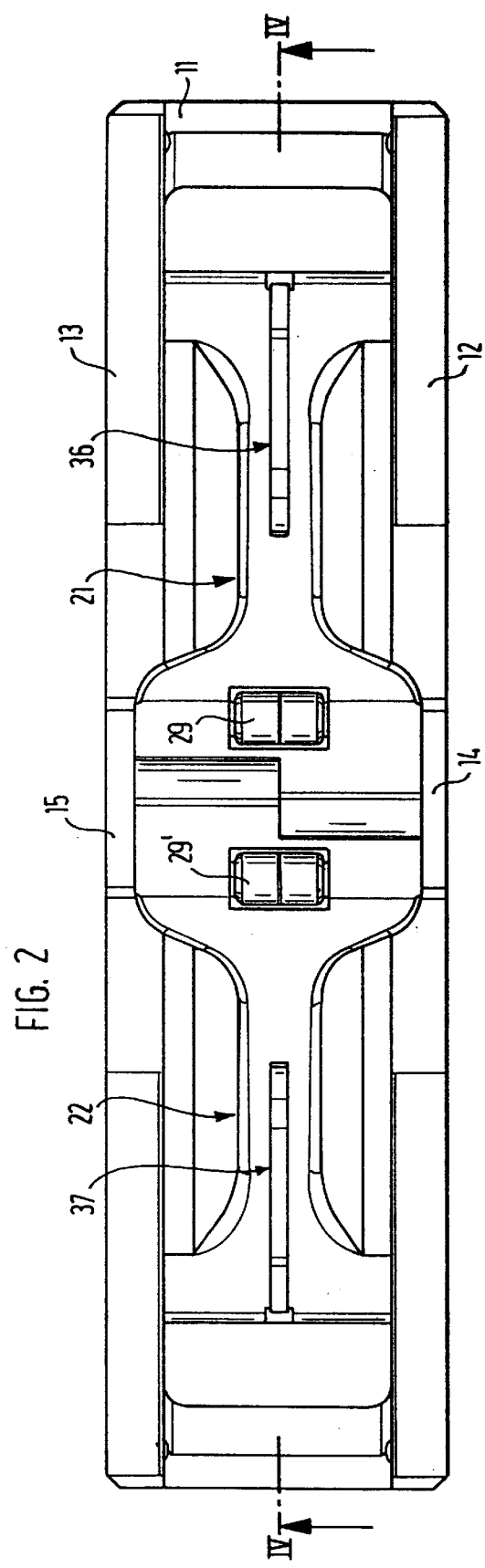
FIG. 2 is a plan view of the latch along the line II—II in FIG. 1.
Figure 3:
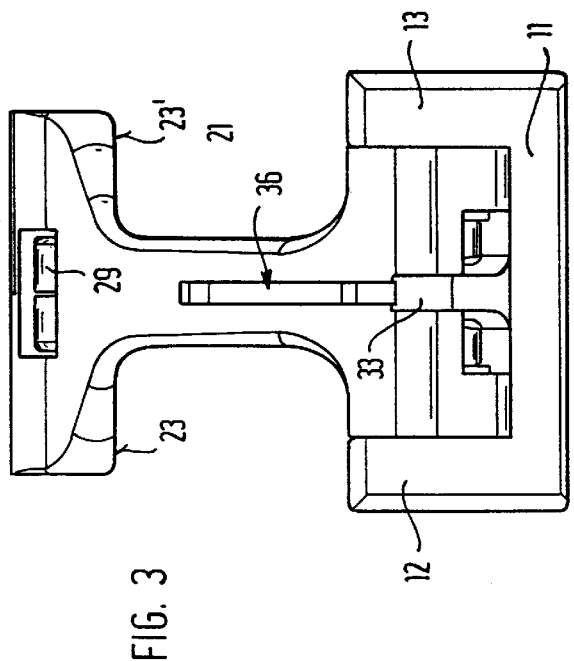
FIG. 3 is a front elevation along the line III—III in FIG. 1.

In the embodiment of cargo latch shown here a frame 10 is provided, which comprises a mostly open floor as well as a first side part 12 and a second side part 13. This is particularly clearly visible in FIGS. 2, 3 and 7.

The side parts 12 and 13 each comprise a recess 14 and 15, respectively. In the side parts 12 and 13 of the frame 10 slots 16, 16' are disposed at one end of the frame 10 and 17, 17' at the other end of the frame 10, as shown in particular in FIGS. 1, 4 and 7. In the slots 16, 16' and 17, 17' there are mounted a first arm 21 and a second arm 22, respectively, of a double latch hook 20, in such a way that the arms bear on a first pair of pins 25, 25' and 26, 26', respectively, at their lower ends and can be both slid horizontally and rotated within the slots 16, 16' and 17, 17' in the frame 10. At their other ends, opposite the pairs of pins 25, 25' and 26, 26', the first arm 21 and second arm 22 are provided with a first pair of hooks 23, 23' and a second pair of hooks 24, 24' respectively, which when the latch is in its operating position, as shown in the drawings, are in contact and substantially flush with one another.

In the region of the lower ends of the arms 21 and 22, in the vicinity of the pairs of pins 25, 25' and 26, 26', a first locking lever 31 and a second locking lever 32, respectively, are rotatably mounted by way of journal bearings 34, 34' at their first ends 33, 33'. At their other ends 35, 35', opposite the first ends 33, 33', the locking levers 31, 32 are provided with hook-shaped projections that form locking surfaces 42, 42'. The locking levers 31, 32 have a mirror-symmetric configuration such that they can engage one another by way of their locking surfaces 42, 42' and thus (in the position shown particularly in FIGS. 4 and 7) connect the lower ends of the arms 21 and 22 to one another in such a way as to prevent their being pulled apart.

At their upper ends the arms 21, 22 are rotatably connected by a connecting shaft 18.

Figure 4:
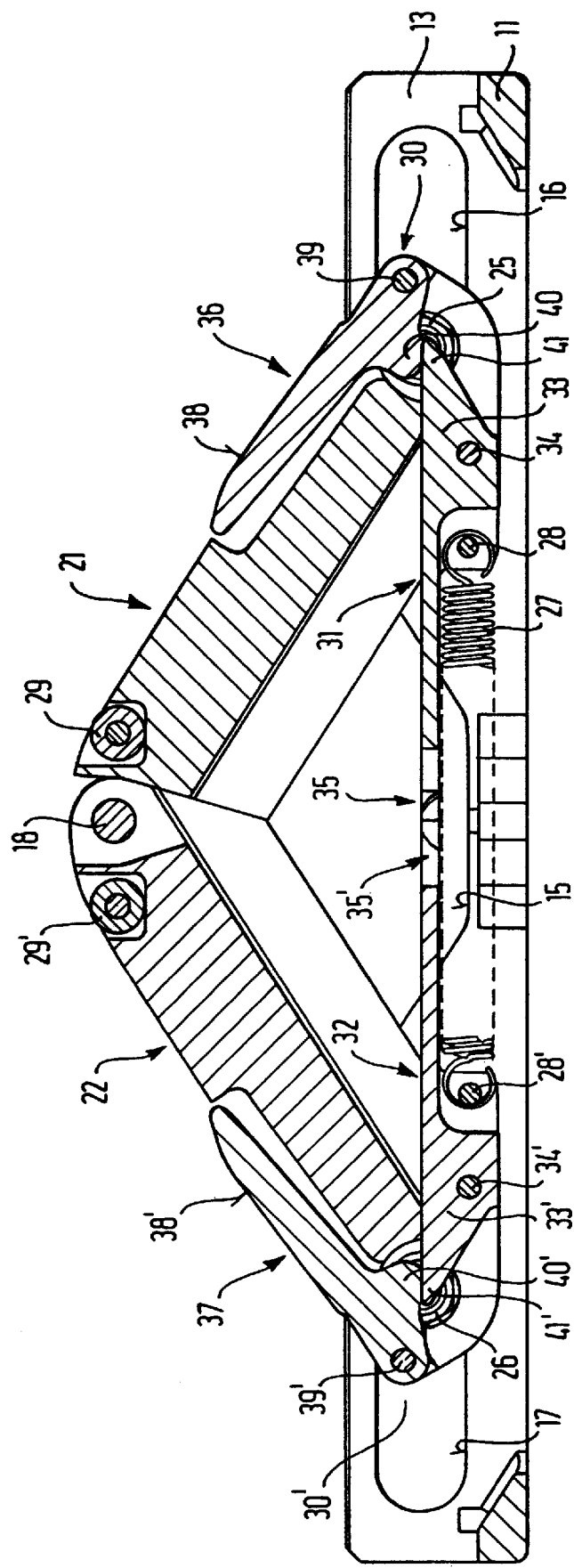
FIG. 4 is a longitudinal section along the line IV—IV in FIG. 2.
Figure 7:
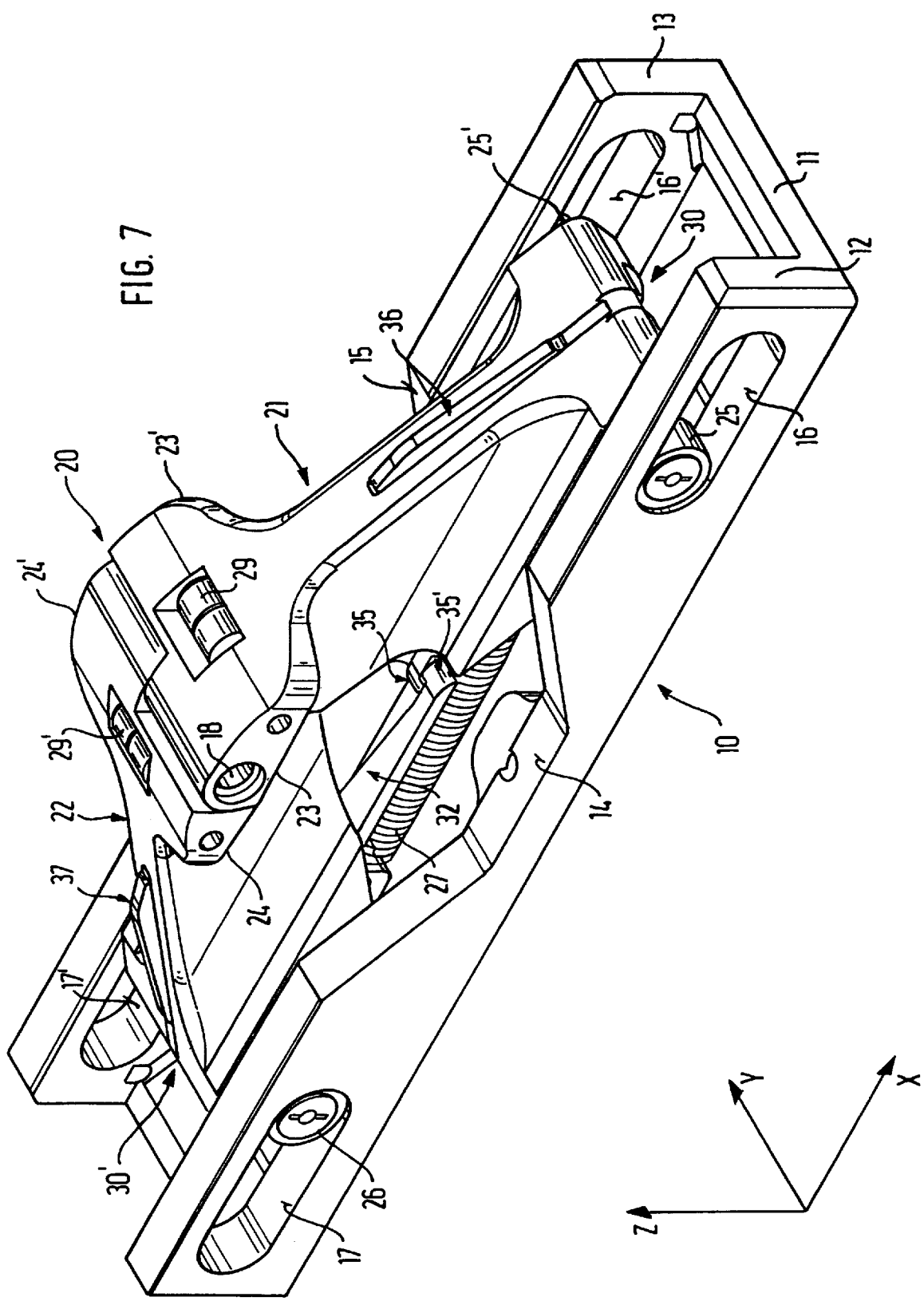
FIG. 7 is a perspective view of the entire latch.

With the components in the position shown in FIGS. 1, 4 and 7 (the operating position) the arms 21, 22 cannot be moved. When pressure is applied from above, i.e. the arms 21, 22 are pressed downward by their upper ends (at the connecting shaft 18), this force tends to drive the lower ends of the arms apart, so that the pair of pins 25, 25' would become further separated from the pair of pins 26, 26'. This effect is counteracted by the locking levers 31, 32, which block the movement of the arms 21, 22.

To release the arms 21, 22 there are provided a first actuating lever 36 at the first arm 21 and a second actuating lever 37 at the second arm 22. The actuating levers 36, 37 are rotatably attached by their lower ends to the arms 21, 22, by way of journal bearings 39, 39'. Each lever is provided on its outer side with an impact surface 38, 38', which is the first place to make contact with the lower edge of a container moving towards the latch in the X direction (see FIG. 7) or the opposite direction.

The actuating levers 36, 37 further comprise actuating lugs or cams 40, 40' which, when the actuating levers 36, 37 are in the free, unactuated state, rest on actuating ends 41, 41 of the locking levers 31, 32. The locking levers 31, 32 are constructed as two-sided levers, at the first ends 33, 33' of which the actuating ends 41, 41' are situated and at the other ends of which, i.e. on the other side of the journal bearings 34, 34', the locking surfaces 42, 42' are provided.

On the side of the locking levers 31, 32 terminating in the second ends 35, 35' there are further provided holding pegs 28, 28', which are joined to one another by a spring 27 under tension. The locking levers 31, 32 and the actuating levers 36, 37 together constitute releasable locking mechanisms 30, 30'.

Figure 5:
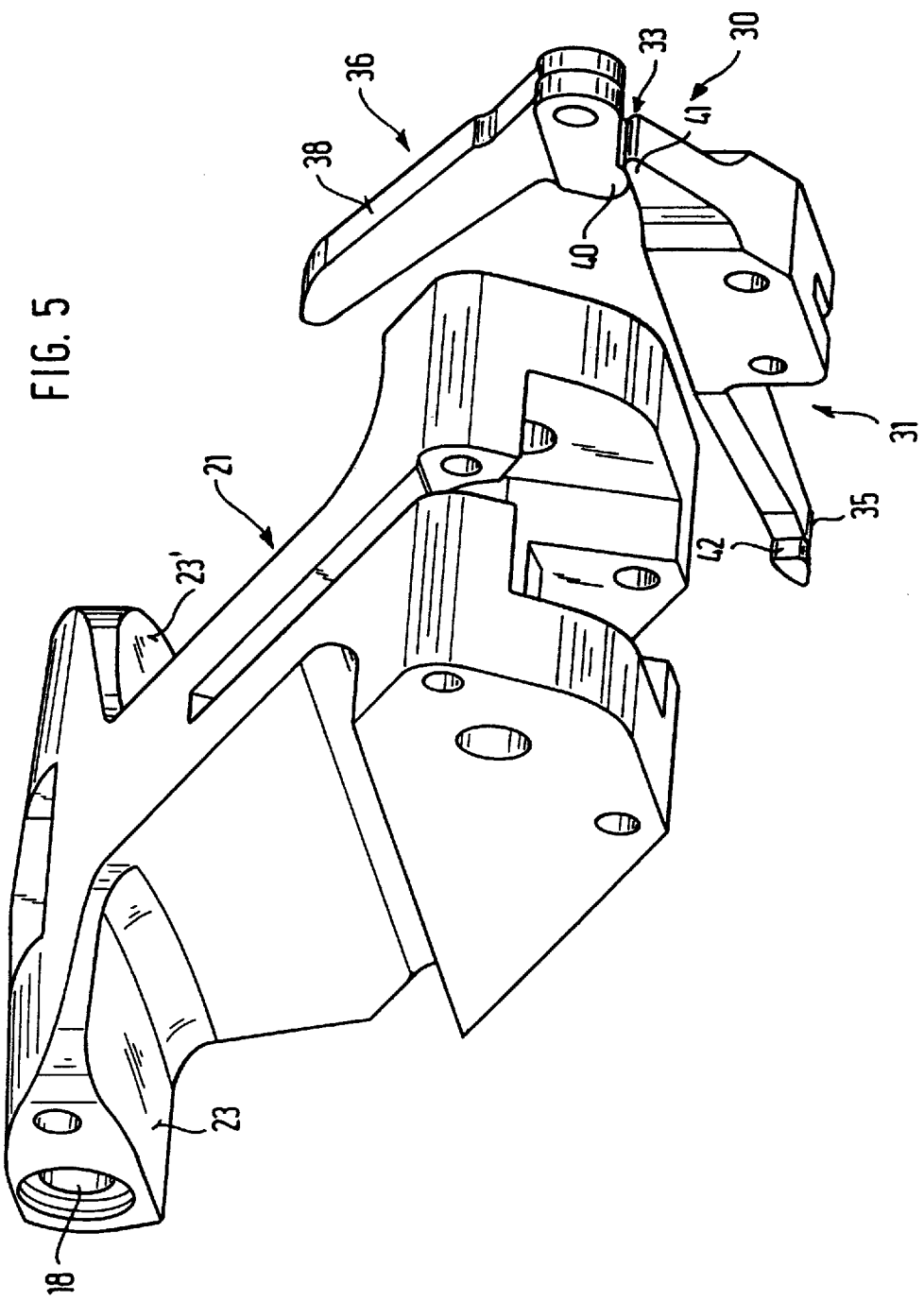
FIG. 5 is an exploded perspective view of part of the latch.
Figure 6:
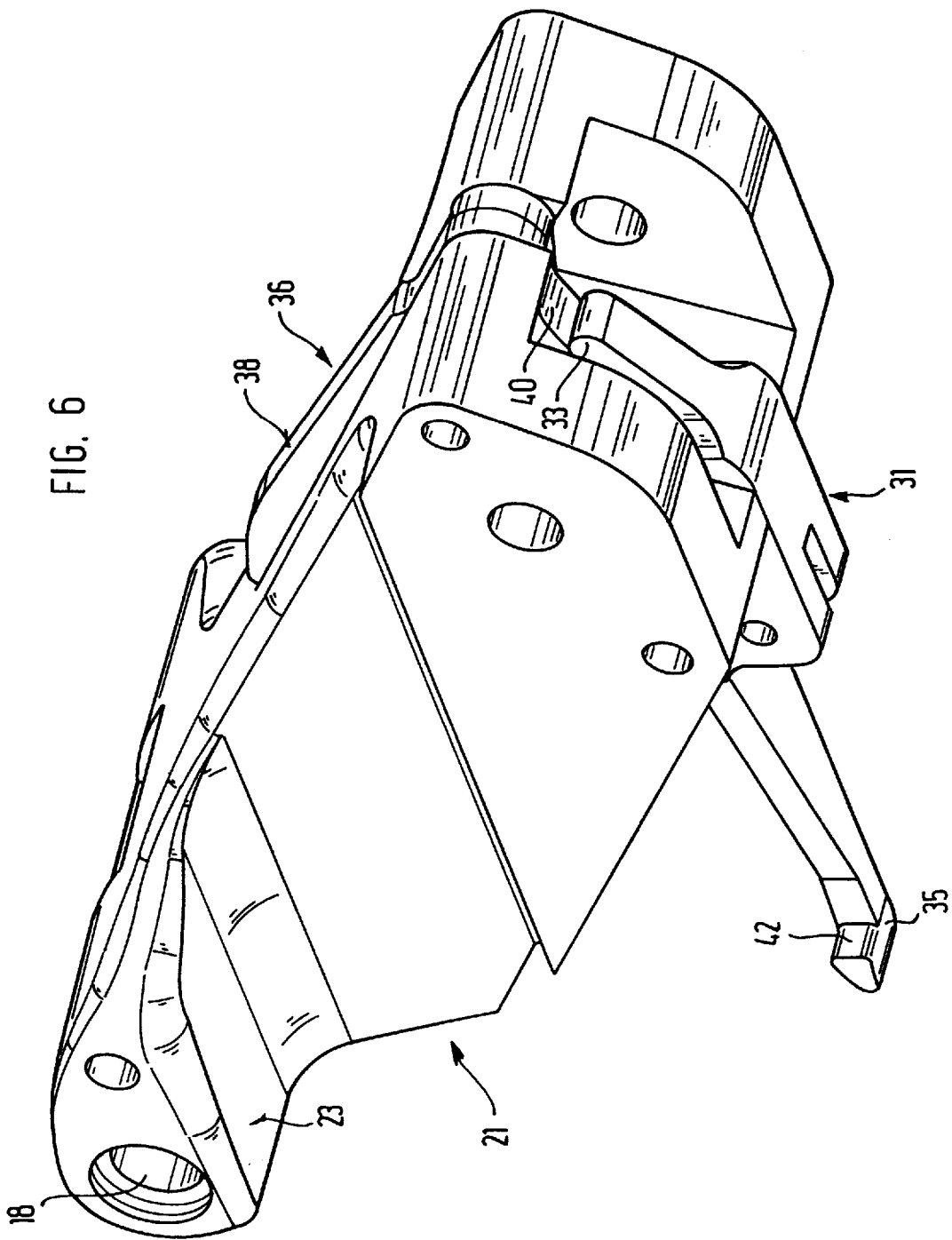
FIG. 6 the part of the latch shown in FIG. 5 but in a partially assembled state.

The arrangement functions in such a way that when a container strikes against the first actuating lever 36, ie. coming from the right in FIG. 4, the actuating lever 36 is rotated counterclockwise. Its actuating lug 40 then presses, as shown in FIGS. 5 and 6, on the actuating end 41 of the first locking lever 31. As a result, the latter is rotated clockwise about its journal bearing 34, so that its second end 35 is raised, whereas the second end 35' of the second locking lever 32 remains in its original position, as shown in particular in FIGS. 4 and 7. Because of the rotating movement of the first locking lever 31, its locking surface 42 is separated from the locking surface of the second locking lever 32.

As the container now moves further along, the surface on the side of the first actuating lever 36 opposite to the impact surface 38 strikes against the floor of the groove formed in 35 the first arm 21 to receive the actuating lever 36. The moving container thus exerts a force that acts in a clockwise direction on the first arm 21. Because the two locking levers 31, 32 have now been separated from one another, and hence no longer interlock so as to resist being pulled apart, the force exerted by the container on the first arm 21 causes the arm 21 to be rotated counterclockwise and, owing to the coupling by way of the connecting shaft 18, the second arm 22 to be rotated clockwise. Simultaneously the lower ends of the arms 21, 22 move apart, the first pair of pins 25, 25' sliding to the right and the second pair of pins 26, 26' to the left (as shown in FIGS. 4 and 7), which places the spring 27 under further tension. The advancing container can now proceed over rollers 29, 29' provided at the upper ends of the arms 21, 22. As soon as the back end of the container leaves the second arm 22, the spring 27 pulls the lower ends of the arms 21, 22 together again. Because there is no longer an external force acting on the actuating levers 36, 37, the second end 35' of the one locking lever 32 can slide along the second end 35 of the first locking lever 31 (or conversely) until the locking surfaces 42, 42' again engage one another, so that the arrangement has returned to the operating position shown in FIG. 4. The sliding of the two lever ends along one another is achieved by appropriately constructed slanting surfaces at the ends 35, 35' of the locking levers 31, 32, shown in particular in FIGS. 4, 5 and 6, as well as by the fact that force exerted by the spring 27 places the two locking levers 31, 32 in a position in which the locking levers 31, 32 (as shown in FIG. 4) are flush with one another.

What is claimed is:

1. A cargo latch for securing items of cargo in the cargo area of an aircraft comprising a frame adapted for attachment to holding rails located on the floor of the cargo area;

a double latch hook mounted in the frame and comprising two arms that are pivotally mounted to one another at first ends and that have second ends mounted in the frame, each of the first ends being provided with a hook element capable of engaging and retaining an item of cargo; and the second ends of the arms being mounted in the frame in such a way that, when the locking mechanisms are in their unlocked position, the arms can move in a plane of rotation (x,z) when they are struck by an item of cargo traveling in a first horizontal direction (x) parallel to the plane of rotation (x,z), the first ends of the arms being deflected downward from an upper operating position toward the frame; and releasable locking mechanisms connected to said arms and moveable between a locked position in locking engagement for blocking downward rotation of the arms and moveable to an unlocked position out of said locking engagement in response to a frontal impact force in the horizontal direction by an item of cargo.

2. A latch as claimed in claim 1, wherein at least one of the arms is mounted in the frame so as to be longitudinally slidable in the first horizontal direction (x).

3. A latch as claimed in claim 1, comprising a spring means that urges said arms into said operating position.

4. A latch as claimed in claim 3, wherein the spring means is attached to the locking mechanisms in such a way that it urges the locking mechanisms into their locked position.

5. A cargo latch for securing items of cargo in the cargo area of an aircraft comprising a frame adapted for attachment to holding rails located on the floor of the cargo area, a double latch hook mounted in the frame and comprising two arms that are pivotally mounted to one another at first ends and that have second ends mounted in the frame, each of the first ends being provided with a hook element capable of engaging and retaining an item of cargo; and releasable locking mechanisms connected to said arms and moveable between a locked position and an unlocked position, the second ends of the arms being mounted in the frame in such a way that, when the locking mechanisms are in their unlocked position, the arms can move in a plane of rotation (x,z) when they are struck by an item of cargo traveling in a first horizontal direction (x) parallel to the plane of rotation (x,z), the first ends of the arms being deflected downward from an upper operating position toward the frame; and the releasable locking mechanisms in their locked position blocking downward rotation of the arms in such a way that the arms can be deflected downward only when unlocked by the frontal impact of an item of cargo moving in the first horizontal direction against one of the arms, the locking mechanisms each comprising a locking lever that is rotatably mounted at a first end to the second end of one of the arms respectively and at a second end is so constructed such that it can engage the second end of the other lever so as to resist being separated therefrom by a separating force when the arms are in their operating position and can disengage the second end of the other lever when rotated.

6. A latch as claimed in claim 5, wherein the locking mechanisms comprise two actuating levers, each of which, when struck by a moving item of cargo, rotates an associated one of said locking levers and disengages it from the other locking lever.

7. A cargo latch for securing items of cargo in the cargo area of an aircraft comprising:

a frame adapted for attachment to holding rails located in the cargo area;

first and second arms pivotally connected to one another at first ends thereof and extending from said first ends to second ends slidably supported by said frame for movement between an upper operating position in which said arms form an apex and various downward positions as said second ends of said arms move apart to collapse said apex;

spring means urging said arms to said operating position; and a first locking lever rotatably connected to said second end of said first arm and a second locking lever rotatably connected to said second end of said second arm for movement between a locked position interconnecting said second ends of said arms to prevent said arms from moving out of said operating position and an unlocked position allowing said arms to move out of said operating position as said second ends of said arms move apart.

8. A latch as claimed in claim 7, including actuating levers extending along each of said arms for rotating said locking levers to said unlocked position in response to a force applied thereto.

9. A latch as claimed in claim 8 wherein each of said actuating levers includes a cam engaging the associated locking lever for rotating said associated locking lever out of said locked position.

* * * * *